United States Patent
Paxton et al.

(10) Patent No.: US 10,266,145 B2
(45) Date of Patent: Apr. 23, 2019

(54) FRONTAL AIRBAG ASSEMBLIES

(71) Applicant: Autoliv ASP, Inc., Ogden, UT (US)

(72) Inventors: Donald James Paxton, Romeo, MI (US); Frank Herzenstiel, Davisburg, MI (US); Mangala Ambalangodage Jayasuriya, Bloomfield Hills, MI (US)

(73) Assignees: Autoliv ASP, Inc., Ogden, UT (US); Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 15/650,694

(22) Filed: Jul. 14, 2017

(65) Prior Publication Data
US 2019/0016291 A1  Jan. 17, 2019

(51) Int. Cl.
*B60R 21/214* (2011.01)
*B60R 21/232* (2011.01)
*B60R 21/2338* (2011.01)
*B60R 21/00* (2006.01)

(52) U.S. Cl.
CPC .......... *B60R 21/214* (2013.01); *B60R 21/232* (2013.01); *B60R 21/2338* (2013.01); *B60R 2021/0004* (2013.01); *B60R 2021/0044* (2013.01); *B60R 2021/0048* (2013.01); *B60R 2021/0058* (2013.01); *B60R 2021/23382* (2013.01)

(58) Field of Classification Search
CPC . B60R 21/214; B60R 21/232; B60R 21/2338; B60R 2021/23382; B60R 2021/0044; B60R 2021/0048; B60R 2021/0058; B60R 2021/0004
See application file for complete search history.

(56) References Cited

U.S. PATENT DOCUMENTS

| | | | | |
|---|---|---|---|---|
| 7,625,008 B2 * | 12/2009 | Pang | ...................... | B60R 21/231 280/743.1 |
| 7,926,840 B1 * | 4/2011 | Choi | ...................... | B60R 21/214 280/730.1 |
| 8,480,123 B2 * | 7/2013 | Choi | ...................... | B60R 21/231 280/730.1 |
| 8,579,321 B2 * | 11/2013 | Lee | ........................ | B60R 21/214 280/729 |
| 8,764,055 B2 * | 7/2014 | Fischer | .................. | B60R 21/205 280/739 |
| 8,807,593 B2 | 8/2014 | Lee et al. | | |
| 2007/0262572 A1 * | 11/2007 | Fischer | .................. | B60R 21/231 280/730.1 |
| 2011/0062693 A1 * | 3/2011 | Williams | ............ | B60R 21/2338 280/743.2 |
| 2018/0236962 A1 * | 8/2018 | Ohno | ..................... | B60R 21/207 |
| 2018/0354447 A1 * | 12/2018 | Nakajima | ............. | B60R 21/231 |

* cited by examiner

*Primary Examiner* — Darlene P Condra
(74) *Attorney, Agent, or Firm* — Stoel Rives LLP

(57) ABSTRACT

Inflatable frontal restraint air cushions, or frontal curtain airbags, are disclosed herein. An occupant impact zone is formed by an opening at an inner area of the frontal restraint air cushion extending from a rearward surface to a forward surface, the opening defining a free end of the occupant impact zone and a fixed end of the occupant impact zone such that the free end is pivotable relative to the fixed end. The occupant impact zone is to deflect forward with impact of the head of the vehicle occupant.

25 Claims, 12 Drawing Sheets

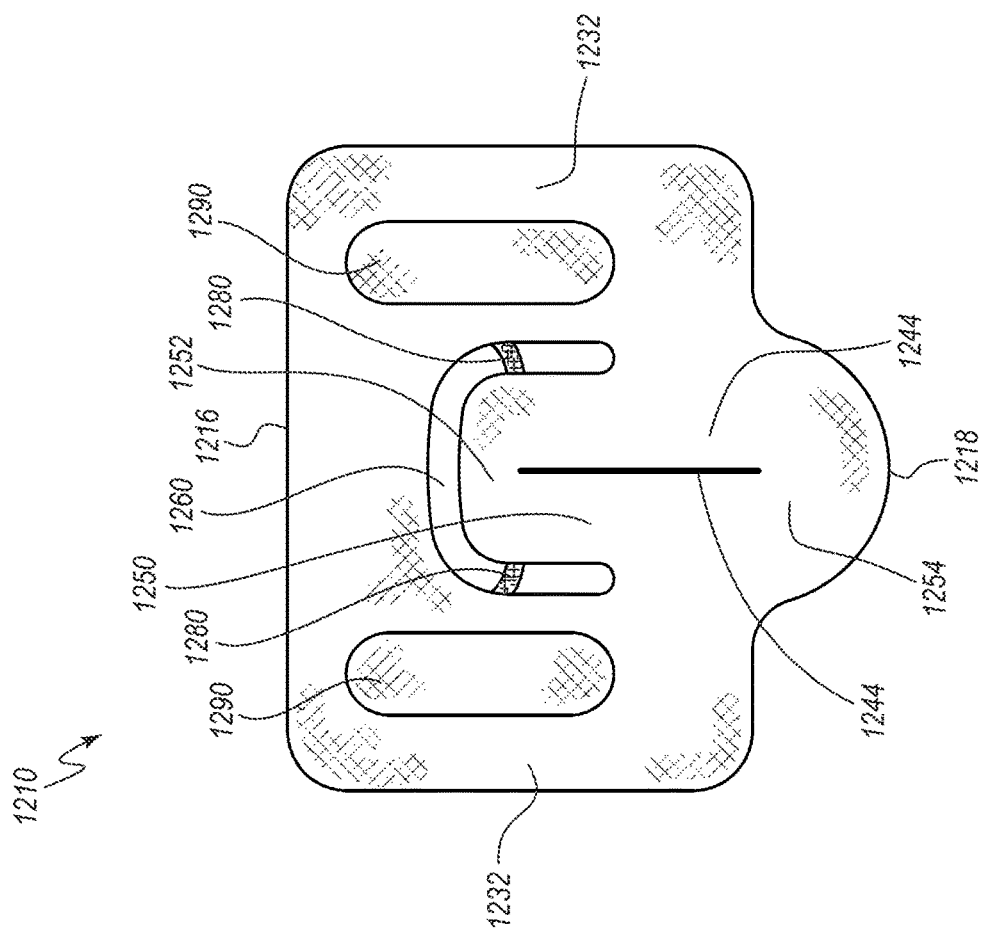

FRONTAL AIRBAG ASSEMBLIES

TECHNICAL FIELD

The present disclosure relates generally to the field of automotive protective systems. More specifically, the present disclosure relates to frontal airbag assemblies.

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIG. 12 is a rear view of an air cushion of an inflatable frontal restraint air cushion assembly, according to another embodiment, including restraint tethers.

DETAILED DESCRIPTION

Figure 1A:
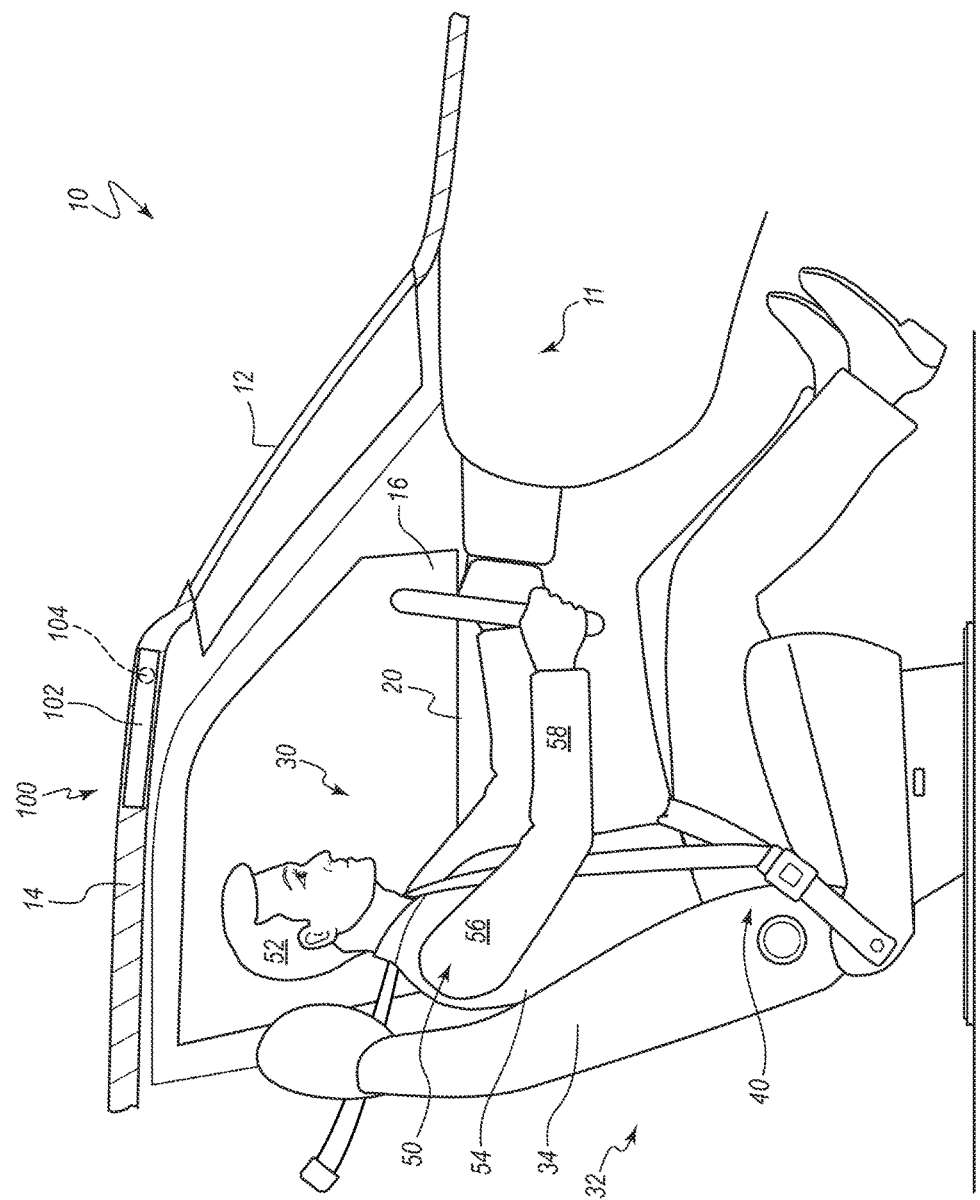
FIG. 1A is a side view of a vehicle seating position within a vehicle having an inflatable frontal restraint air cushion assembly in a packaged state.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

For purposes of this disclosure, an "occupant" is a person or crash test dummy within a motor vehicle, whether driving the motor vehicle or riding as a passenger. The occupant, whether a driver or a passenger, is identified in the accompanying drawings by the same numerical demarcation. Within the description, the term "driver" refers to an occupant in a vehicle seating position specifically provided for the operator of the motor vehicle. The term "passenger" refers to an occupant in any vehicle seating position other than that provided for a driver. The term "occupant" may refer to any occupant. The terms "driver" and "passenger" may be used when describing a feature, functionality, etc., having a substantive difference relevant to the specific vehicle seating position involved.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" or "air cushion" generally refers to an inflatable frontal curtain airbag configured to deploy from a roof of a cabin of a vehicle.

As used in this disclosure, the term "fixed" refers to a region of a component which is directly coupled to or attached to something else so as to be less flexible than an adjacent free region of the component. The relative difference of flexibility may be transient. Fixed does not mean that the denoted component or region is rigid or immovable, nor does it mean that the denoted component or region is coupled to a rigid or immovable component or structure.

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from the packaged state of the compact configuration to an expanded state of a deployed configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

An airbag assembly can mitigate injury to an occupant of a vehicle during a collision event by reducing the effect of impact of the occupant against structures (body-structure impact) within the vehicle (e.g., a dashboard or door column). Certain embodiments of airbag assemblies that are disclosed herein are particularly well suited for cushioning a front-seat passenger (including a driver of a vehicle), and may be mounted in a roof of the vehicle. Other embodiments of the airbag assemblies disclosed herein may be particularly useful for protecting occupants who are seated rearward of the front seats of a vehicle.

Some embodiments disclosed herein can provide improved positioning, cushioning, and/or safety to occupants involved in particular types of collisions. For example, some embodiments can be particularly suited to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap frontal crash test and the NHTSA oblique impact test are disclosed in the Insurance Institute for Highway Safety, *Small Overlap Frontal Crashworthiness Evaluation Crash Test Protocol (Version II)* (December 2012) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

FIG. 1A is a side view of a vehicle seating position 30 within a vehicle 10 including an inflatable frontal restraint air cushion assembly 100 in a packaged state. The embodiment of FIG. 1A is for a driver frontal restraint air cushion assembly 100; however, the disclosures herein can be similarly applied to a passenger frontal restraint air cushion assembly. That is to say, the disclosures herein may be applied to a frontal restraint air cushion assembly for any vehicle seating position within a vehicle. In FIG. 1A, an occupant 50 is seated in an occupant seat assembly 32 with an occupant restraint harness assembly 40. A head 52, a torso 54, shoulder(s) 56, and arms 58 of the occupant 50 are shown positioned as they may be during normal or typical operation of the vehicle 10. A dashboard 11 or instrument panel, a windscreen 12, and a door 20 of the vehicle are shown for reference. A steering wheel 16 is shown, indicating the occupant 50 is seated in a driver vehicle seating position 30. A roof 14 of the vehicle 10 is also shown.

The inflatable frontal restraint air cushion assembly 100 is mounted in the vehicle 10 in a packaged state at the roof 14 of a vehicle compartment of the vehicle 10. For example, the inflatable frontal restraint air cushion assembly 100 may be mounted in or to a header of the roof 14 of the vehicle 10. The frontal restraint air cushion assembly 100 includes a housing 102 and an inflator 104. The housing 102 may include an air cushion (hereafter described) in a packaged and compressed state.

While the housing 102 depicted in FIG. 1A is shown in the roof 14 extending from a position near the upper edge of the windscreen 12 rearward a distance, this is for illustrative purposes only. The disclosures herein anticipate that other housing formats may be used as appropriate for a specific vehicle/roof configuration. For example, the shape of the housing 102 may be such as to conform to an aperture in the roof 14 (such as "sunroof"), or to permit removal of a section of the roof 14 (e.g., in the case of "convertible").

The inflator 104 may be within or partially within the housing 102, or may be adjacent to or near the housing 102. The inflator 104 includes a device or mechanism to produce inflation gas for inflating an air cushion (see, e.g., 110 in FIG. 1B) and any ducts, conduits, plumbing, fixtures, switches, or other components related to activating the inflator 104 and providing inflation gas to the air cushion 110. The air cushion 110 may be a frontal curtain airbag. The inflatable air cushion 110 is configured to receive inflation gas to expand and deploy downward to a deployed state disposed between the vehicle seating position 30 and a component of the vehicle 10 that is positioned forward of the vehicle seating position 30. When the air cushion 110 is installed above the vehicle seating position 30 of a driver occupant 50, the component forward of the vehicle seating position 30 is the steering wheel 16. When the air cushion 110 is installed above the vehicle seating position 30 of a passenger occupant, the component forward of the vehicle seating position 30 may be the dashboard 11 or a seat back 34 of a forwardly adjacent seat assembly 32.

Figure 1B:
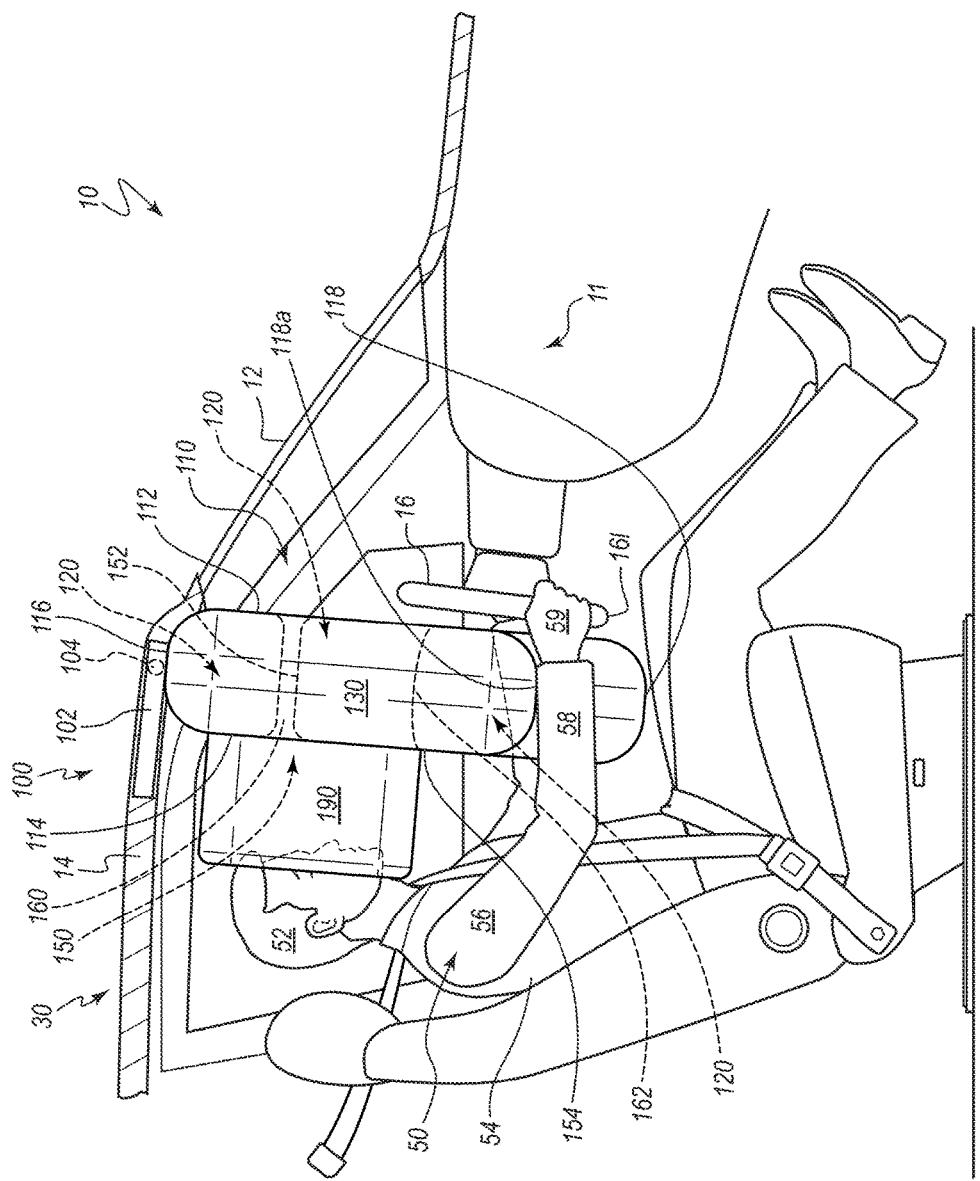
FIG. 1B is a side view of the inflatable frontal restraint air cushion assembly of FIG. 1A with the air cushion deployed and at least partially inflated and prior to engagement by the occupant.

FIG. 1B is a side view of the vehicle seating position 30 within the vehicle 10. The inflatable frontal restraint air cushion assembly 100 of FIG. 1A is shown with the air cushion 110 deployed and at least partially inflated and prior to engagement by the occupant 50. The occupant 50 is seated upright with the head 52, torso 54, shoulder(s) 56, arms 58, and hands 59 positioned as they may be during normal vehicle operation. The inflator 104 has been activated by operation of one or more sensors (not shown) on predetermined condition(s), such as detection of a collision. The air cushion 110 is configured to deploy from the packaged state at the roof (or header) 14 of the passenger compartment to a deployed state disposed between a steering wheel 16 of the vehicle 10 and the vehicle seating position 30 to provide collision protection for the driver 50 of the vehicle 10. The air cushion 110 is shown deployed from the housing 102 and at least partially inflated by action of the inflator 104. The air cushion 110 may include a Y-sock within an inflatable chamber 120 to direct inflation gas in two different directions. In other words, a Y-sock within the inflatable chamber 120 may receive inflation gases from the inflator 104 and direct the inflation gases in two directions in order to facilitate rapid and even deployment, inflation, and disposition of the air cushion 110. For example, a Y-sock may be used to direct inflation gases both inboard and outboard, distributing and/or channeling inflation gases to more outward areas of the inflatable chamber 120 first.

The air cushion 110 comprises one or more panels, including at least a vehicle facing panel 112 and an occupant facing panel 114, defining the inflatable chamber 120 to receive inflation gas from the inflator 104. The air cushion 110 may be formed from a single, unitary piece of suitable material, or from multiple pieces of suitable material, along with appropriate folds, cuts, seams, and other methods of manufacture to form the air cushion 110. A seam may be formed by sewing, taping, radio-frequency (RF) welding, adhesive, or any other appropriate method.

When the inflator 104 is activated, inflation gas may be delivered to the air cushion 110 causing the air cushion 110 to deploy and expand from the packaged state at the roof 14 of the vehicle 10 downward. In a deployed state, the air cushion 110 may be disposed between the vehicle 10 and the vehicle seating position 30. The air cushion 110 may include an occupant impact zone 150 formed by an opening 160 at an inner area of the frontal restraint air cushion 110 extending from a rearward surface to a forward surface. The opening 160 couples at the rear at the occupant facing panel 114 and at the front at the vehicle facing panel 112. The opening 160 may define a free end 152 of the occupant impact zone 150. Opposite the free end 152 of the occupant impact zone 150 is a fixed end 154 of the occupant impact zone 150. The free end 152 and the fixed end 154 of the occupant impact zone 150 couple to each other at a flex region (not shown, but see, e.g., 156 in FIG. 2). The flex region 156 generally corresponds to a lower extent 162 of the opening 160. At the flex region 156, the free end 152 may articulate (pivot or rotate) relative to the fixed end 154. The occupant impact zone 150 may include that region of the air cushion 110 generally defined by the occupant facing panel 114 within an area between the upper extent (not shown, but see, e.g., 161 in FIG. 2) of the opening 160 and a distal edge 118 of the air cushion 110 and further defined laterally by the opening 160. In other words, the occupant impact zone 150 is generally between the top (upper extent 161) of the opening 160 and the bottom (distal edge 118) of the air cushion 110, and between the lateral members (not shown, but see, e.g., 163 in FIG. 2) of the opening 160. Below the lateral member 163 of the opening 160, the occupant impact zone 150 may be laterally broadened to include that region of the occupant facing panel 114 below supplemental lobes 190 to accommodate the shoulders 56 and torso 54 of the occupant 50.

The air cushion 110, as shown in FIG. 1B, has not engaged the instrument panel 11, nor the windscreen 12, nor the steering wheel 16. As the air cushion 110 deploys and inflates, it is disposed rearward of the steering wheel 16 and instrument panel 11, and does not engage the windscreen 12. Simply stated, the occupant impact zone 150 may be positioned in the deployed state of the air cushion 110 to receive the head 52 and torso 54 of the occupant 50 moving from the vehicle seating position 30 primarily in a forward direction relative to the vehicle 10 during a vehicle impact event.

A proximal edge 116 of the air cushion 110 is coupled at the roof 14 and/or housing 102. The air cushion 110 is configured to extend below a lower rim 161 of the steering wheel 16 to provide collision protection for a chest (torso 54) of the driver 50 of the vehicle 10. In other words, the air cushion 110 deploys downward from the roof 14 such that the distal edge 118 is disposed lower than the lower rim 161 of the steering wheel 16. The air cushion 110 may be configured such that the distal edge 118 will extend lower than the lower rim 161 of the steering wheel 16 even if the steering wheel 16 is of variable geometry. In other words, if the steering wheel 16 is not isometrically circular, the lower rim 161 of the steering wheel 16 may vary by the rotational position of the steering wheel 16, and the distal edge 118 can be disposed lower than the lowest possible extent of the steering wheel 16 regardless of the shape and rotational position of the steering wheel 16. A main cushion 130 may include cutaway areas at the distal edge 118 of the frontal restraint air cushion 110, the cutaway areas to accommodate one or more of the hands 59 or arms 58 of the occupant 50 holding the steering wheel 16. In other words, the distal edge 118 of the air cushion 110 may have a variable profile (more evident when viewed from a different angle; see, e.g., FIG. 2, et seq.) to allow the air cushion 110 to both extend lower than the lower rim 161 of the steering wheel 16 and also accommodate, at an arm accommodation 118a, the arm(s) 58 of the occupant 50 while grasping the steering wheel 16.

The air cushion 110 may include the supplemental lobes 190 extending rearward from a rearward surface of the air cushion 110. The supplemental lobes 190 may couple at the rearward face of the occupant facing panel 114 of the air cushion 110. The supplemental lobes 190 may facilitate receiving the head 52 of the occupant 50 during a collision event, producing a lateral component of movement of the head, such as, for example, an oblique collision. The supplemental lobes 190 are further described below.

Figure 1C:
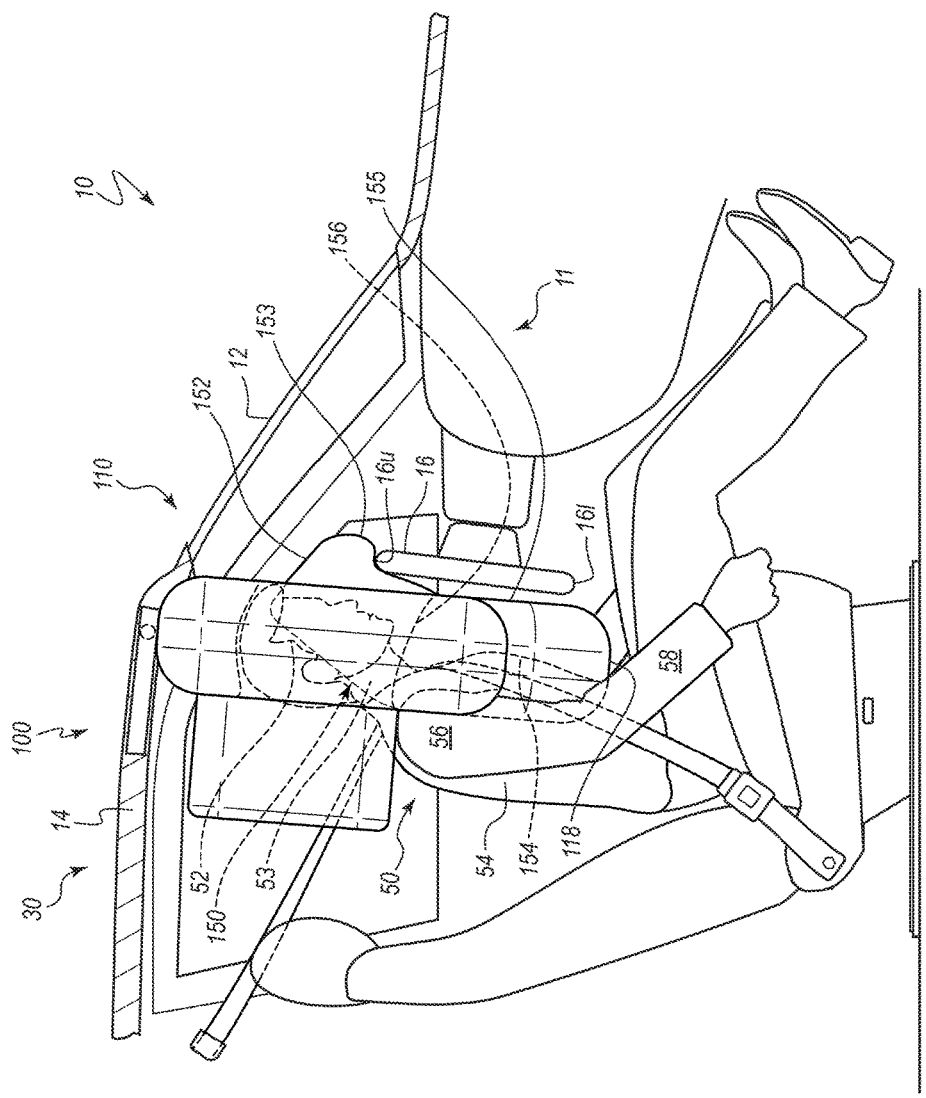
FIG. 1C is a side view of the inflatable frontal restraint air cushion assembly of FIG. 1A with the air cushion deployed and at least partially inflated and engaged by the occupant.

FIG. 1C is a side view of the vehicle seating position 30 within the vehicle 10 having the inflatable frontal restraint air cushion assembly 100 of FIG. 1A with the air cushion 110 deployed and at least partially inflated and engaged by the occupant 50. The opening 160 formed through the air cushion 110 extends from a rearward occupant-receiving surface (the occupant facing panel 114, inclusive of the occupant impact zone 150) to a forward vehicle-facing surface (the vehicle facing panel 112). The occupant impact zone 150 is configured to deflect forward and around the steering wheel 16 with impact of the head 52 of the occupant 50. The occupant impact zone 150 includes a fixed end 154 such that the free end 152 is pivotable (or rotatable) relative to the fixed end 154. More specifically, the free end 152 of the occupant impact zone 150 may articulate (e.g., pivot or rotate) forward relative to the fixed end 154 with the impact of the head 52 of the occupant 50 such that the fixed end 154 functions as a hinge. In other words, the occupant impact zone 150 may flex or bend at the flex region 156 such that the free end 152 of the occupant impact zone 150 may articulate to accommodate the head 52 of the occupant 50. The impact of the head 52 of the occupant 50 may cause the free end 152 of the occupant impact zone 150 to pivot/rotate forward such that the upper and forward surface of the free end 152 serves as a free end steering wheel reaction region 153. That is, the free end steering wheel reaction region 153 may engage an upper rim 16u of the steering wheel 16 such that the steering wheel 16 supports the free end steering wheel reaction region 153 during ride down. The free end steering wheel reaction region 153 may deform around the upper rim 16u of the steering wheel 16 in order to afford deceleration (absorption of impact energy) of the head 52 of the occupant 50 in much the same way that an upper region of a typical frontal airbag may deform to decelerate the head of an occupant.

The frontal restraint air cushion 110 is configured to deploy to engage a reaction surface to secure the frontal restraint air cushion 110 and/or absorb energy between the occupant 50 and the reaction surface. For example, the torso 54 of the occupant 50 may engage the lower region of the occupant impact zone 150 and push the air cushion 110 forward against the steering wheel 16 such that the steering wheel 16 serves as a reaction surface to secure and support the air cushion 110 and absorb energy between the occupant 50 and the steering wheel 16. The lower region of the occupant impact zone 150, extending from approximately the flex region 156 downward to the distal edge 118, thereby serves as a fixed end steering wheel reaction region 155 such that the fixed end steering wheel reaction region 155 may move forward with the impact of the torso 54 of the occupant 50 and rest against the steering wheel 16. The steering wheel 16 may support the fixed end steering wheel reaction region 155 of the occupant impact zone 150 in order to decelerate (absorb impact energy) of the torso 54 of the occupant 50 during ride down. In other words, as the occupant 50 impacts the occupant impact zone 150 of the air cushion 110, the head 52 and torso 54 of the occupant 50 may cause the occupant impact zone 150 of the air cushion 110 to move forward and rest against the steering wheel 16 in a differential fashion to accommodate articulation of the head 52 while absorbing the impact energies of the head 52 and torso 54.

In a collision wherein the occupant 50 is restrained (e.g., by a harness assembly 40 as shown and indicated in FIG. 1A), the restraint may limit the degree to which the torso 54 engages the occupant impact zone 150 of the air cushion 110; however, the head 52 and a neck 53 of the occupant 50 are unrestrained but for the coupling of the neck 53 to the torso 54 of the occupant 50 and the interposition of the free end 152 of the occupant impact zone 150. The ability of the occupant impact zone 150 to articulate (rotate or pivot) to accommodate the impact of the head 52 of the occupant 50 may reduce or prevent injuries to the head 52 and/or neck 53 of the occupant 50. Likewise, in a collision wherein the occupant 50 is unrestrained, the interposition of the articulating occupant impact zone 150 may reduce or prevent injury to the head 52, neck 53, and/or torso 54 of the occupant 50.

Figure 2:
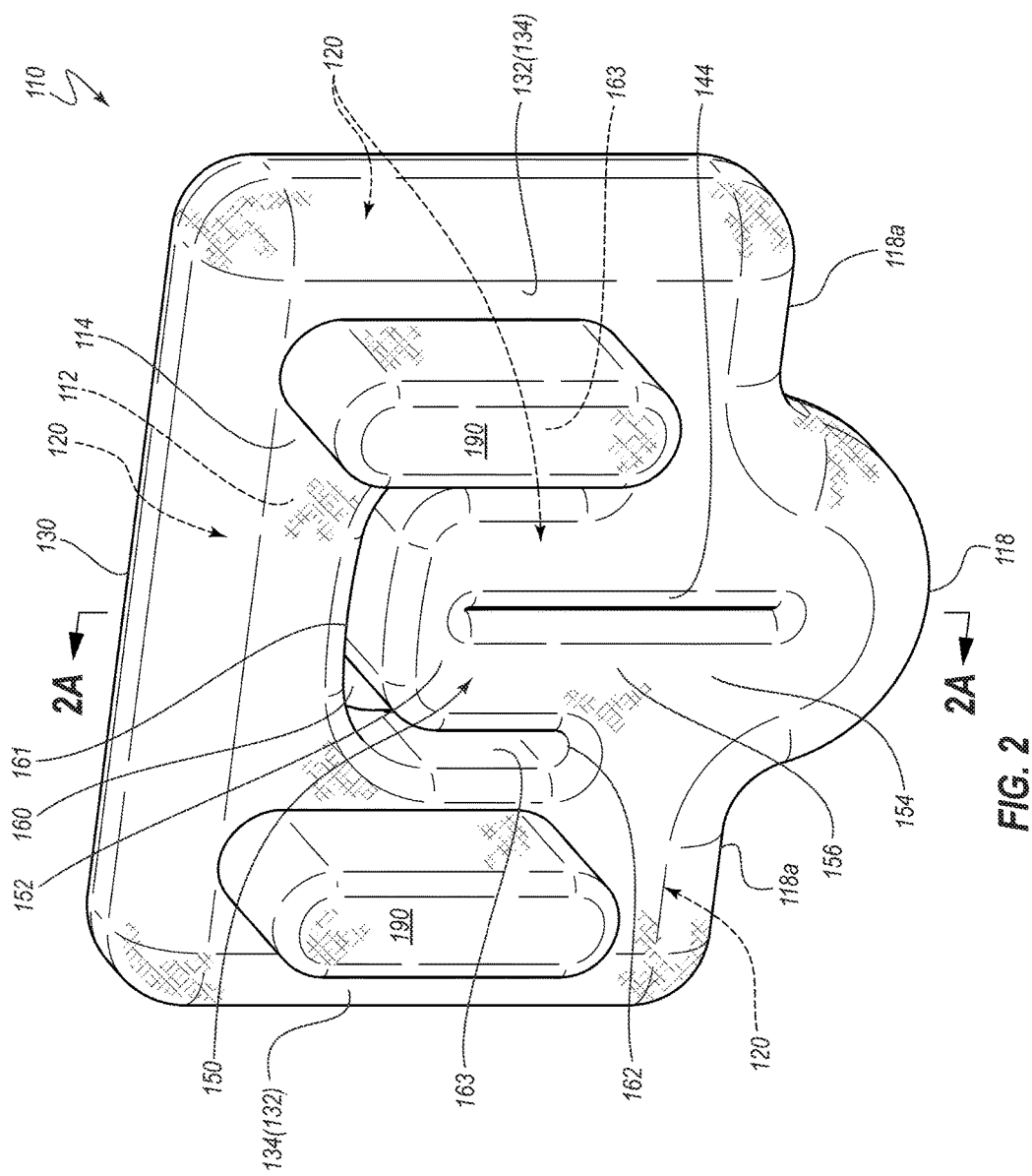
FIG. 2 is an oblique view of the air cushion of the inflatable frontal restraint air cushion assembly of FIG. 1A with the air cushion at least partially inflated.

FIG. 2 is an oblique view of the air cushion 110 of the inflatable frontal restraint air cushion assembly 100 of FIG. 1A with the air cushion 110 at least partially inflated. The single inflatable air chamber 120 may be defined by the main cushion 130. In other words, the single inflatable air chamber 120 may include the inflatable regions of the main cushion 130, the occupant impact zone 150, and lateral support regions 132, 134. The supplemental lobes 190 may be appendages to, or protrusions from, a rear surface (occupant facing panel 114) of the single inflatable air chamber 120. The occupant impact zone 150 further defines the single inflatable air chamber 120 of the frontal restraint air cushion 110. The main cushion 130 of the air cushion 110 includes an inboard (relative to the vehicle) support region 132 and an outboard (relative to the vehicle) support region 134 (collectively, lateral support regions 132, 134) to either side of the occupant impact zone 150 and outboard (relative to the air cushion 110) of the supplemental lobes 190. The lateral support regions 132, 134 are separated from the free end 152 of the occupant impact zone 150 by the opening 160 (see, e.g., FIGS. 1B and 2A). The shoulder(s) 56 of the occupant 50 may impact the lateral support regions 132, 134 during a collision event. The lateral support regions 132, 134 may assist in disposing the occupant impact zone 150 between the occupant (see 50 in FIG. 1B) and vehicle structures (such as, e.g., the steering wheel 16 and/or dashboard 11 in FIG. 1B) forward of the occupant 50. The distal edge 118 of the main cushion 130 may include arm accommodations 118a located laterally to either side of the occupant impact zone 150 to accommodate the arms (see 58 in FIG. 1B) of the occupant 50 when grasping the steering wheel 16. The lateral support regions 132, 134 are further defined (vertically) by the arm accommodations 118a. The lateral support regions 132, 134 may prevent the shoulder(s) 56 of the occupant 50 from impacting the steering wheel 16 or other structure of the vehicle 10, thereby reducing or preventing injury to the shoulder(s) 56.

As shown in FIG. 2, the opening 160 at the inward region of the frontal restraint air cushion 110 is shaped as an upside-down "U" shape to at least partly form the occupant impact zone 150 to be hinged about the fixed end 154 at a lower portion of the occupant impact zone 150. In other words, the opening 160 which at least partially defines the deflectable occupant impact zone 150 has the general shape of an inverted letter U. The U-shaped opening 160 may form the occupant impact zone 150 to be hinged about the fixed end 154 at a bottom portion, near or toward the distal edge 118, of the occupant impact zone 150, with the lower extent 162 of the opening 160 to either side of the free end 152 of the occupant impact zone 150 and inboard (relative to the air cushion 110) of the supplemental lobes 190. The deflectable occupant impact zone 150 includes a free end 152 and a fixed end 154, the free end 152 defined by the opening 160 to pivot relative to the fixed end 154. The fixed end 154 may operate as a hinge about which the free end 152 pivots. The deflectable occupant impact zone 150 is to be positioned in the deployed state of the inflatable air cushion 110 to receive and flex forward with the head 52 of the occupant 50 moving from the vehicle seating position 30 primarily in a forward direction relative to the vehicle 10 during a vehicle impact event. The opening 160 may allow the occupant impact zone 150 to articulate or "hinge" such that the free end 152 may pivot or rotate forward through the flex region 156 when impacted by the head 52 of the occupant 50 (see, e.g., FIG. 1C) and during ride down. The fixed end 154 may remain relatively vertical (relative to the vehicle 10) when impacted by the torso 54 of the occupant 50.

The air cushion 110 may include one or more internal tethers (see, e.g., 140 in FIG. 2A), including at least one internal tether 140 in the main cushion 130, a rear interface 144 of which is shown in the occupant facing panel 114. The internal tethers 140 are more fully described below with reference to FIG. 2A.

The air cushion 110 may include two supplemental lobes 190. A supplemental lobe 190 may be disposed on and extend rearward in a direction of the vehicle seating position 30 from the rearward surface at a position outward from the opening at the inner (or inward) area or region of the frontal restraint air cushion 110. In other words, each supplemental lobe 190 may couple to the occupant facing panel 114 of the main cushion 130 at a point outboard (relative to the main cushion 130) of the opening 160, and extend rearward. More specifically, each supplemental lobe 190 may extend rearward in a direction toward the vehicle seating position (see 30 in FIG. 1B) from the rearward surface (occupant facing panel 114). Locating the supplemental lobes 190 outboard of the opening 160 in the main cushion 130 may dispose the supplemental lobes 190 to either side of the head 52 of the occupant 50 (see, e.g., FIGS. 1B and 1C). The supplemental lobe 190 thus disposed may receive the head 52 of the occupant 50 and limit rotation of the head 52 about a Z-axis (vertical axis) in an oblique collision event. By receiving the head 52 and limiting rotation of the head 52 during an oblique collision event, the supplemental lobes 190 may reduce or prevent injury to the head 52 or neck 53 of the occupant 50.

Figure 2A:
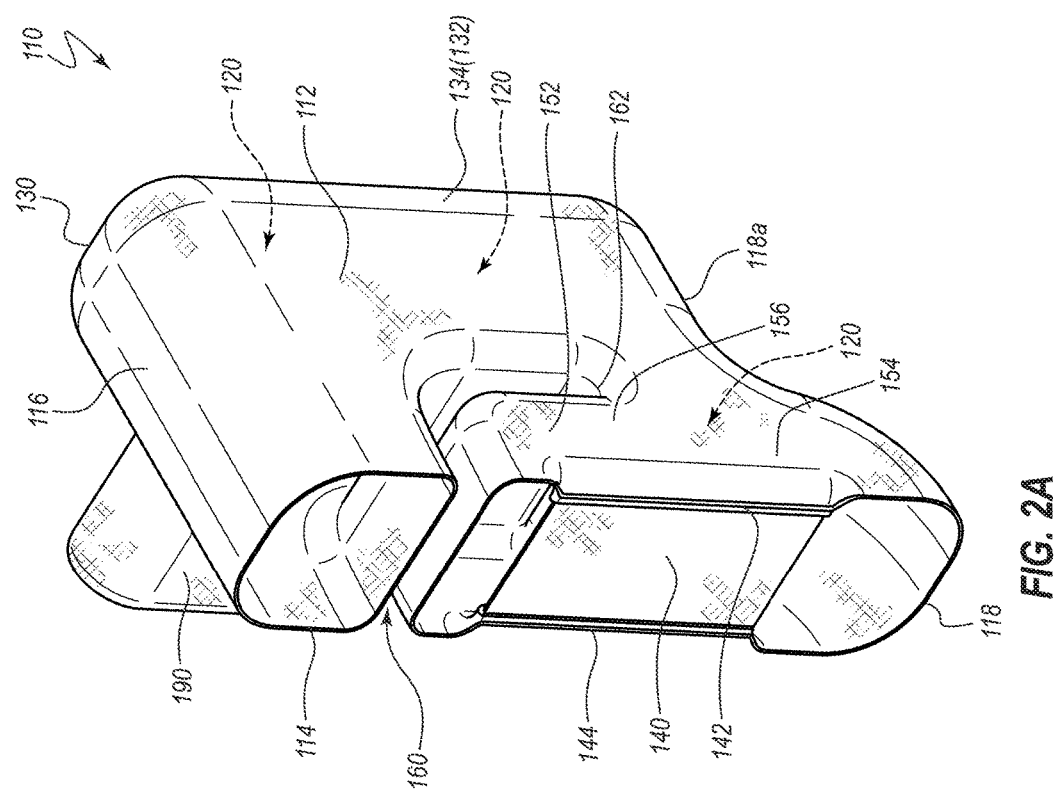
FIG. 2A is an oblique cutaway view of the air cushion of the inflatable frontal restraint air cushion assembly of FIG. 1A with the air cushion at least partially inflated.

FIG. 2A is an oblique cutaway view of the air cushion 110 of the inflatable frontal restraint air cushion assembly 100 of FIG. 1A with the air cushion 110 at least partially inflated. The section angle of FIG. 2A is indicated as 2A-2A in FIG. 2. For reference, the proximal edge 116 and distal edge 118 are identified, as well as one of the arm accommodations 118a. One supplemental lobe 190 is identified for further orientation. The opening 160 and lower extent 162 of the opening 160 through the main cushion 130 is also identified. A vertical internal tether 140 may be included internal to the main cushion 130 to assist in limiting longitudinal expansion of the main cushion 130.

As may be apparent from FIG. 2A, the frontal restraint air cushion 110 comprises a single inflatable chamber 120 that includes the inflatable portions of the occupant impact zone 150 and surrounding portions of the air cushion 110. The air cushion 110 defines the single inflatable chamber 120, including the inflatable regions of the deflectable occupant impact zone (see 150 in FIG. 2) and the inboard and outboard lateral support regions 132, 134. The inflatable chamber 120 comprises an inflatable portion of the deflectable occupant impact zone 150. That is to say, the inflatable portion of the deflectable occupant impact zone 150 is integral to (and defines a portion of) the inflatable chamber 120. Simply stated, the air cushion 110 includes a single inflatable chamber 120 which, in turn, includes the inflatable portions within the occupant impact zone 150, the two lateral support regions 132, 134 and the supplemental lobes 190. The air cushion 110 is configured to deploy to engage a reaction surface to absorb energy between the occupant 50 and a reaction surface. As shown in FIG. 2A, the vertical internal tether 140 is coupled at a first end to an interior surface of a panel of the one or more panels forming the rearward surface and at a second end to an interior surface of a panel of the one or more panels forming the forward surface. In other words, the internal tether 140 couples to an interior surface of the occupant facing panel 114 at the rear interface 144, and to an interior surface of the vehicle facing panel 112 at a forward interface 142. The vertical internal tether(s) 140 may limit a thickness (or depth) of the frontal restraint air cushion 110 and thereby control the shape of the air cushion 110. The vertical internal tether(s) 140 within the inflatable chamber 120 may limit the longitudinal expansion of the inflatable chamber 120, thereby assisting to properly dispose and shape the air cushion 110. More specifically, the vertical internal tether 140 shown in FIG. 2A may limit longitudinal expansion of the occupant impact zone 150, thereby assisting to properly dispose and shape the occupant impact zone 150. The vertical internal tether 140 within the occupant impact zone 150 of the air cushion 110 may assist in forming and shaping the free end 152 and the fixed end 154 of the deflectable occupant impact zone 150 such that the flex region 156 may articulate or "hinge" to allow the free end 152 to accommodate the head (see 52 in FIG. 1C) of the occupant 50. Additional vertical internal tethers 140 are not shown, but the disclosure anticipates that such may be used to limit longitudinal expansion of other areas of the air cushion 110 and to assist in properly shaping and disposing the air cushion 110.

Figure 2B:
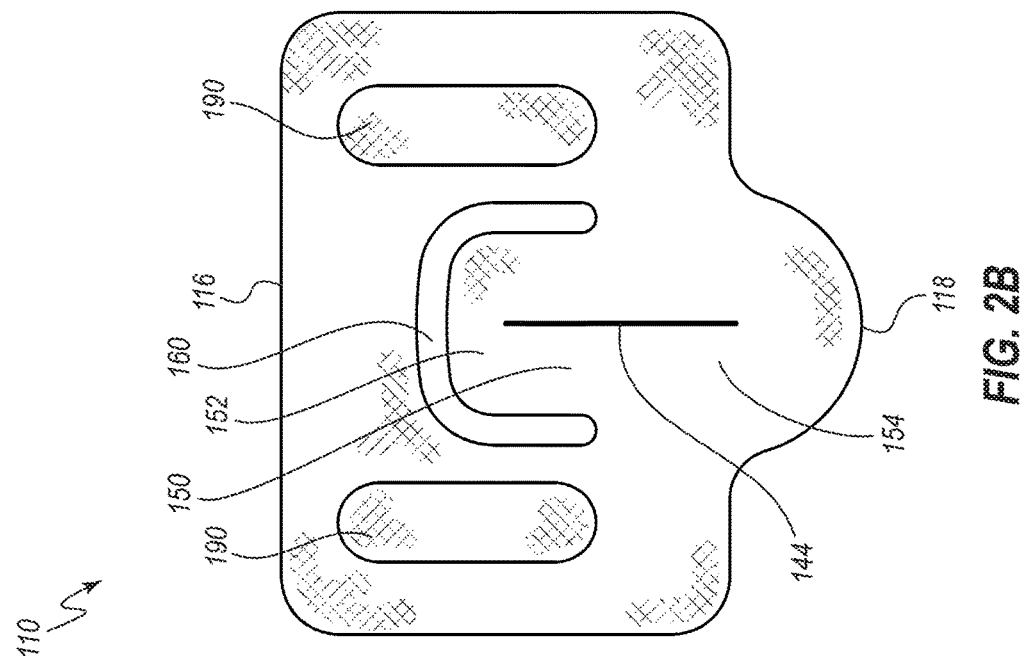
FIG. 2B is a rear view of the air cushion of the inflatable frontal restraint air cushion assembly of FIG. 1A with the air cushion at least partially inflated.

FIG. 2B is a rear view of the air cushion 110 of the inflatable frontal restraint air cushion assembly 100 of FIG. 1A with the air cushion 110 at least partially inflated. FIG. 2B is provided for comparison to some of the possible embodiments of the disclosure, several of which are shown in FIGS. 3 through 11, inclusive. The following components of the air cushion 110 are identified for reference and comparison: the proximal edge 116 and distal edge 118; the opening 160; the occupant impact zone 150, including the free end 152 and the fixed end 154; the rear interface 144 (of the vertical internal tether 140 in FIG. 2A); and the supplemental lobe 190.

Figure 3:
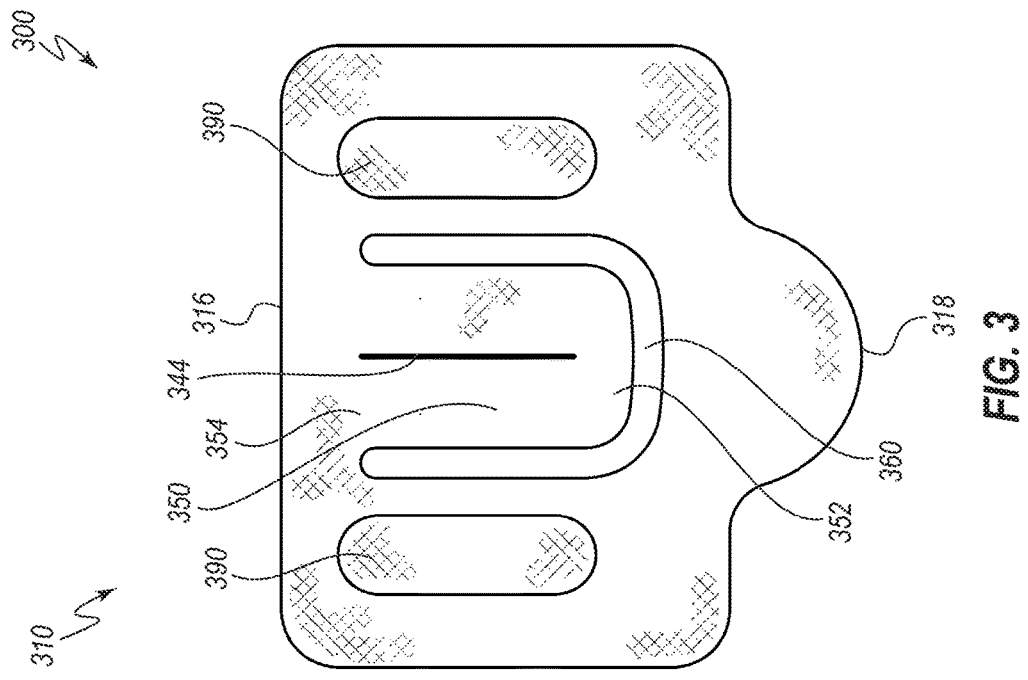
FIG. 3 is a rear view of an air cushion of an inflatable frontal restraint air cushion assembly, according to another embodiment.

FIG. 3 depicts an embodiment of a frontal restraint air cushion assembly 300 that resembles the frontal restraint air cushion assembly 100 described above in certain respects. Accordingly, like features are designated with like reference numerals, with the leading digit incremented to "3." For example, the embodiment depicted in FIG. 3 includes a frontal restraint air cushion 310 that may, in some respects, resemble the air cushion 110 of FIGS. 1A-2B. Relevant disclosure set forth above regarding similarly identified features thus may not be repeated hereafter. Moreover, specific features of the frontal restraint air cushion assembly 100 and related components shown in FIGS. 1A-2B may not be shown or identified by reference numeral in the drawings or specifically discussed in the written description that follows. However, such features may clearly be the same, or substantially the same, as features depicted in other embodiments and/or described with respect to such embodiments. Accordingly, the relevant description of such features apply equally to the features of the frontal restraint air cushion assembly and related components depicted in FIG. 2, et seq. Any suitable combination of the features, and variation of the same, described with respect to the frontal restraint air cushion assembly 100 and related components illustrated in FIGS. 1A-2B can be employed with a frontal restraint air cushion assembly 300 and related components of FIG. 3, and vice versa. This pattern of disclosure applies equally to further embodiments depicted in subsequent figures and described hereafter, wherein the leading digits may be further incremented.

FIG. 3 is a rear view of an air cushion 310, according to another embodiment of a frontal restraint air cushion assembly, similar to the inflatable frontal restraint air cushion assembly 100 of FIG. 1A with the air cushion 310 at least partially inflated. A proximal edge 316, a distal edge 318, and supplemental lobes 390 are shown for reference. In the embodiment of FIG. 3, an opening 360 through the air cushion 310 has the shape of a letter "U." The opening 360 at least partially defines an occupant impact zone 350. In the embodiment of FIG. 3, a fixed end 354 of the occupant impact zone 350 is located near or toward the proximal edge 316. A free end 352 of the occupant impact zone 350 is located lower on the air cushion 310 and defined by the opening 360. A rear interface 344 (of a vertical internal tether, see, e.g., 140 in FIG. 2A) may also be located more proximal to the proximal edge 316 than in some other embodiments.

The fixed end 354 of the occupant impact zone 350 is located substantially closer to the proximal edge 316 than is the free end 152 of the air cushion 110 of FIG. 1A. Locating the fixed end 354 nearer the proximal edge 316 may permit the occupant impact zone 350 to receive a head of an occupant (see, e.g., 1052, 1050 in FIG. 10) and absorb energy between the head 1052 and the vehicle with adequate articulation to reduce or prevent injury to the head 1052. The free end 352 of the occupant impact zone 350 may articulate forward with impact of the torso of the occupant (see, e.g., 54 in FIG. 1A) such that the vehicle facing-side of the free end 352 may rest against a steering wheel (see, e.g., 16 in FIG. 1B) to absorb energy between the torso 54 and the steering wheel 16 during a collision event. For a passenger vehicle seating position embodiment (see, e.g., FIG. 10), a supplemental reaction lobe (see, e.g., 1170 in FIG. 10) may be disposed on the vehicle facing-surface of the fixed end 354 of the occupant impact zone 350 to assist in absorbing energy between the torso (see, e.g., 1054 in FIG. 10) and the vehicle structure immediately forward of the passenger vehicle seating position (e.g., a dashboard or seat back (see, e.g., 1011, 1034 in FIG. 10)). Alternatively or additionally, a supplemental reaction lobe 1170 may be disposed on the vehicle facing-surface of that portion of the air cushion 310 between the opening 360 and the distal edge 318.

Figure 4:
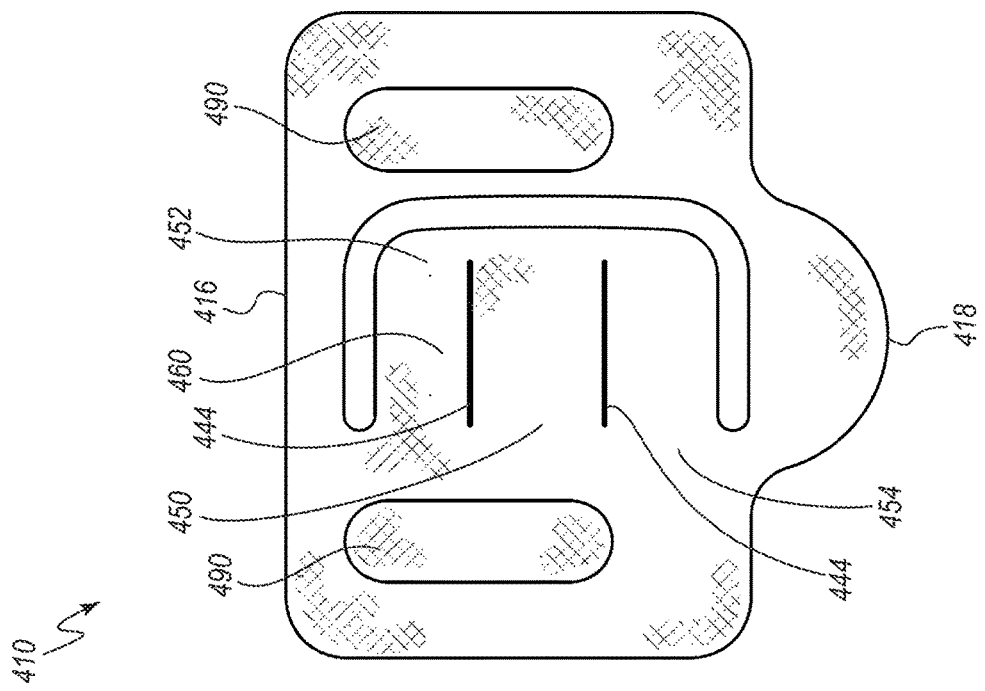
FIG. 4 is a rear view of an air cushion of an inflatable frontal restraint air cushion assembly, according to another embodiment.

FIG. 4 is a rear view of an air cushion 410, according to another embodiment of an inflatable frontal restraint air cushion assembly, according to another embodiment, with the air cushion 410 at least partially inflated. A proximal edge 416 and distal edge 418 of the air cushion 410, as well as supplemental lobes 490, are shown for reference. In an embodiment according to FIG. 4, an opening 460 through the air cushion 410 may have the shape of a letter "C," or of a reversed letter "C." The opening 460 at least partially defines an occupant impact zone 450 of the air cushion 410. The occupant impact zone 450 includes a fixed end 454 located approximately adjacent to the open side of the "C" shape of the opening 460 and a free end 452 located opposite the fixed end 454 within the region defined by the opening 460. In the embodiment of FIG. 4, the air cushion 410 may include one or more horizontal internal tethers, demarked in FIG. 4 by rear interfaces 444, similar to the vertical internal tether of the embodiment of FIGS. 1A-2B, identified as 140 in FIG. 2A.

Figure 10:
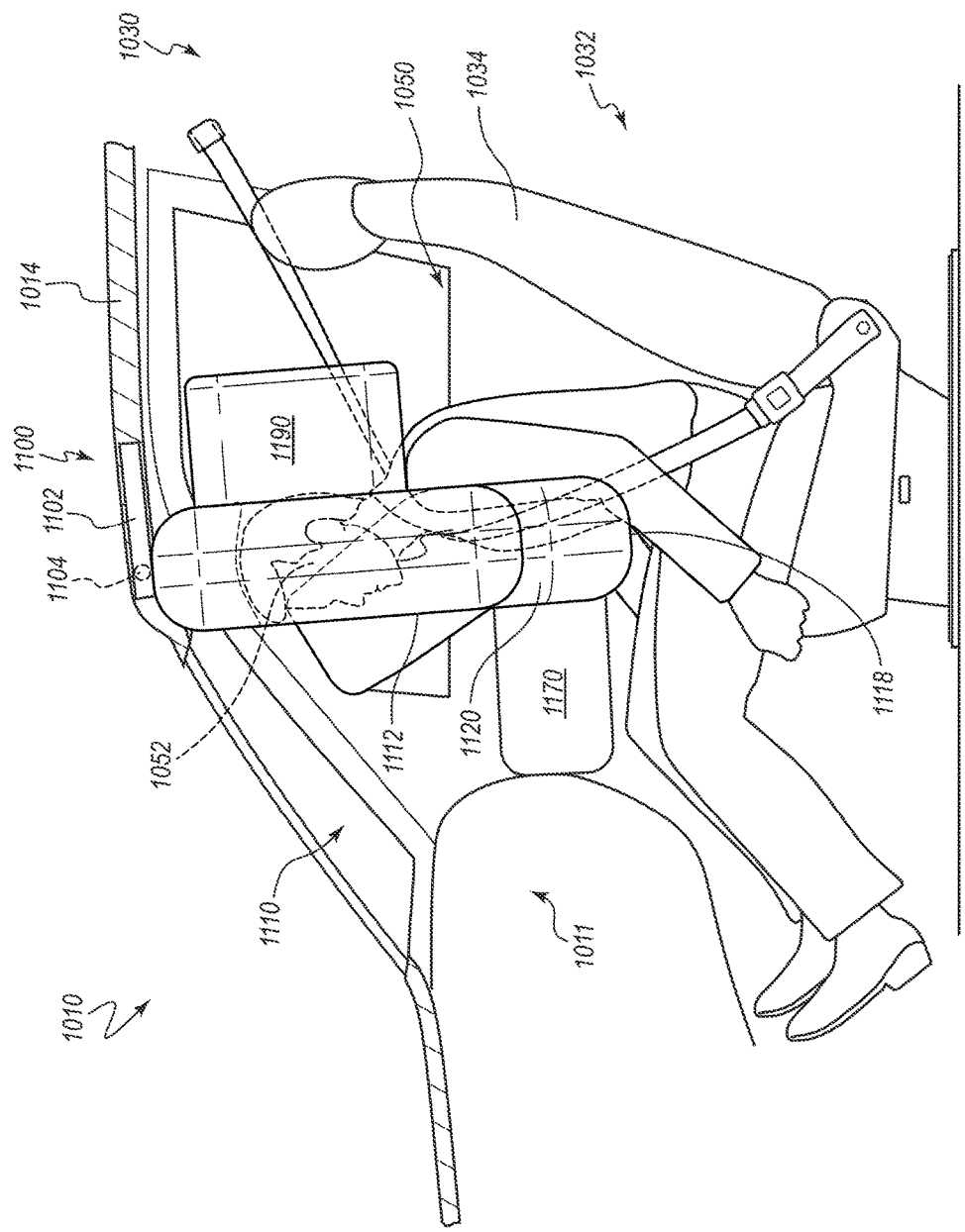
FIG. 10 is a side view of a vehicle seating position within a vehicle having an inflatable frontal restraint air cushion assembly, according to another embodiment, with an air cushion deployed and at least partially inflated and engaged by an occupant.

The configuration of the opening 460 and the occupant impact zone 450 may allow the occupant impact zone 450 to articulate or deflect to support a head and torso of an occupant and absorb energy between the head and torso as described elsewhere (see, e.g., 52, 54 in FIG. 1A, and 1052, 1054 in FIG. 10). Embodiments according to FIG. 4 may include, for a passenger vehicle seating position, one or more supplemental reaction lobes (see, e.g., 1170 in FIG. 10) to assist in energy absorption between the torso 1054 and the vehicle structure immediately forward of the passenger vehicle seating position (e.g., a dashboard or seat back (see, e.g., 1011, 1034 in FIG. 10)).

Figure 5:
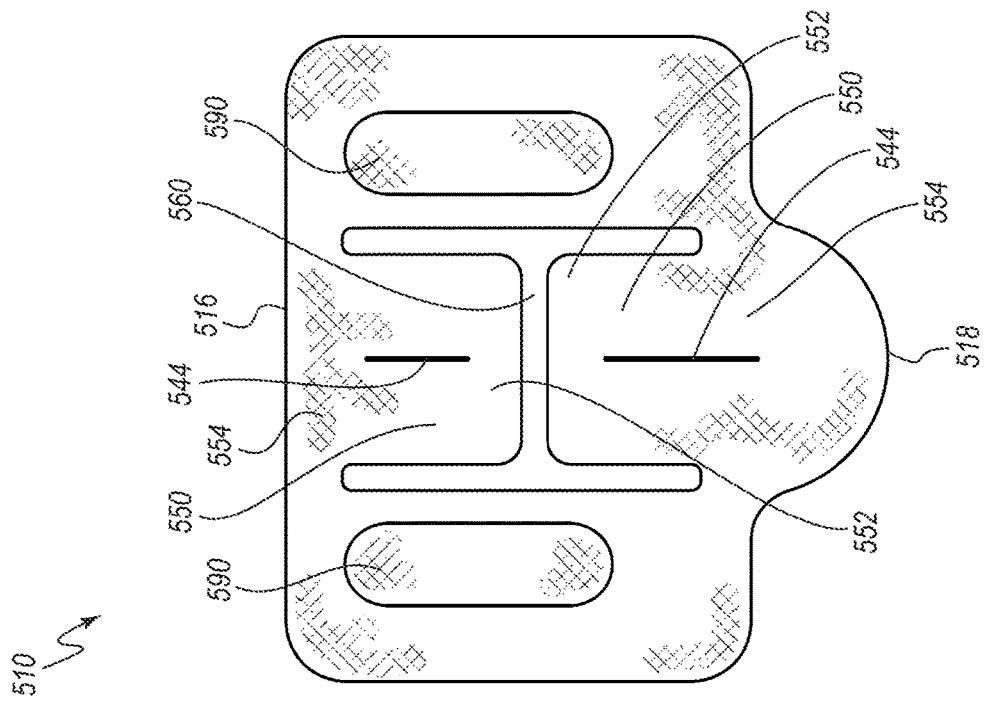
FIG. 5 is a rear view of an air cushion of an inflatable frontal restraint air cushion assembly, according to another embodiment.

FIG. 5 is a rear view of an air cushion 510, according to another embodiment of an inflatable frontal restraint air cushion assembly, according to another embodiment, with the air cushion 510 at least partially inflated. A proximal edge 516 and distal edge 518, as well as supplemental lobes 590, are shown for reference. In an embodiment according to FIG. 5, an opening 560 through the air cushion 510 has the general shape of a letter "H" to form a pair of hinged occupant impact zones 550. The opening 560 defines two generally symmetric regions of forming a pair of occupant impact zones 550. Adjacent to a cross bar of the "H" of the opening 560, each occupant impact zone 550 may have a free end 552 of the occupant impact zone 550, with one free end 552 above the cross bar and one free end 552 below the cross bar. Opposite each free end 552 of the occupant impact zones 550 is a fixed end 554. In an embodiment according to FIG. 5, the air cushion 510 may include one or more vertical internal tethers similar to the vertical internal tether 140 of FIG. 2A and demarked in FIG. 5 by rear interfaces 544.

The configuration of the opening 560 and the occupant impact zones 550 according to the embodiment of FIG. 5 may permit the occupant impact zones 550 to articulate or deflect in order to absorb energy between the head and torso of an occupant (see, e.g., 52, 54, 50 in FIG. 1A) and a steering wheel (see, e.g., 16 in FIG. 1C). A supplemental reaction lobe (see, e.g., 1170 in FIG. 10) may be disposed on the vehicle facing side of the air cushion 510 to support the head and torso of an occupant (see, e.g., 1052, 1054, 1050 in FIG. 10) and absorb impact energy between the occupant 1050 and a vehicle structure immediately forward of the vehicle seating position (e.g., a dashboard or seat back (see, e.g., 1011, 1034 in FIG. 10)).

Figure 6:
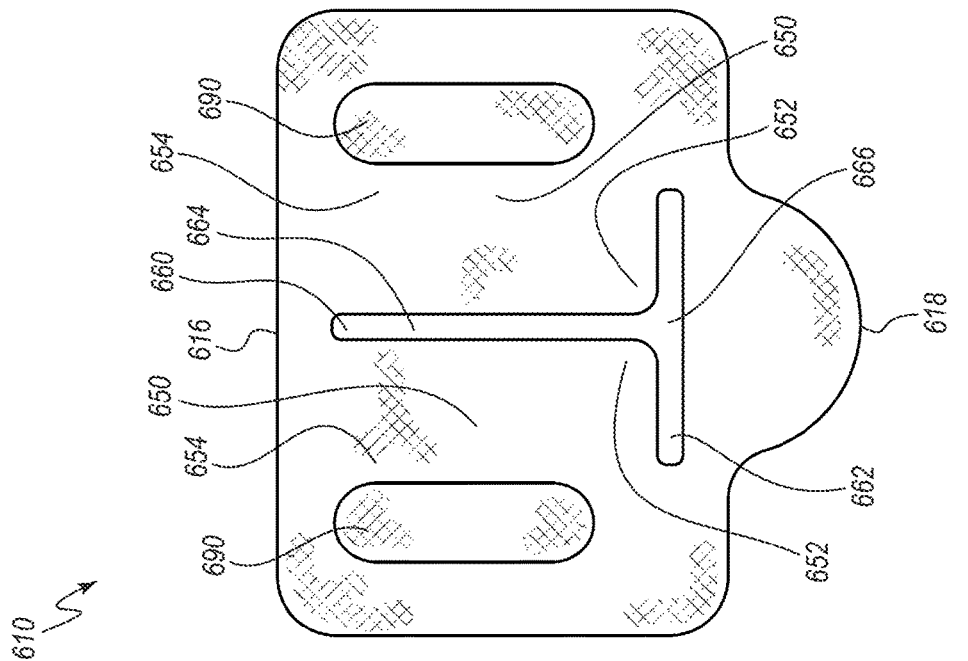
FIG. 6 is a rear view of an air cushion of an inflatable frontal restraint air cushion assembly, according to another embodiment.

FIG. 6 is a rear view of an air cushion 610 of an inflatable frontal restraint air cushion assembly, according to another embodiment, with the air cushion 610 at least partially inflated. A proximal edge 616 and distal edge 618, as well as supplemental lobes 690, are shown for reference. In the embodiment of FIG. 6, an opening 660 through the air cushion 610 has the general shape of an inverted letter "T" to form a pair of hinged occupant impact zones 650. The opening at least partially defines a pair of occupant impact zones 650. In an embodiment according to FIG. 6, a vertical member 664 of the "T" of the opening 660 may bisect the occupant impact zones 650. In other words, the occupant impact zones 650 occupy a region to either side of the vertical member 664 of the opening 660 and above a lower member 662 (analogous to the lower extent 162 of FIG. 2A) of the opening 660. A free end 652 of either occupant impact zone 650 is generally adjacent to the intersection 666 of the two members 662, 664 of the opening 660. The vertical member 664 of the opening 660 bisects the free ends 652 of the occupant impact zones 650. In other words, the free end 652 on either side of the vertical member 664 occupies the apex of the region adjacent to the intersection 666. A fixed end 654 is located opposite each free end 652. More specifically, because the occupant impact zones 650 and free ends 652 are bisected by the vertical member 664 of the opening 660, the fixed end 654 is located diagonally opposite either free end 652.

The configuration of the opening 660 and the occupant impact zones 650 according to the embodiment of FIG. 6 may permit the occupant impact zones 650 to articulate or deflect in order to absorb energy between the head and torso of an occupant (see, e.g., 52, 54, 50 in FIG. 1A) and a steering wheel (see, e.g., 16 in FIG. 1C). A supplemental reaction lobe (see, e.g., 1170 in FIG. 10) may be disposed on the vehicle facing side of the air cushion 610 to support the head and torso of an occupant (see, e.g., 1052, 1054, 1050 in FIG. 10) and absorb impact energy between the occupant 1050 and a vehicle structure immediately forward of the vehicle seating position (e.g., a dashboard 1011 or seat back 1034 as in FIG. 10).

Figure 7:
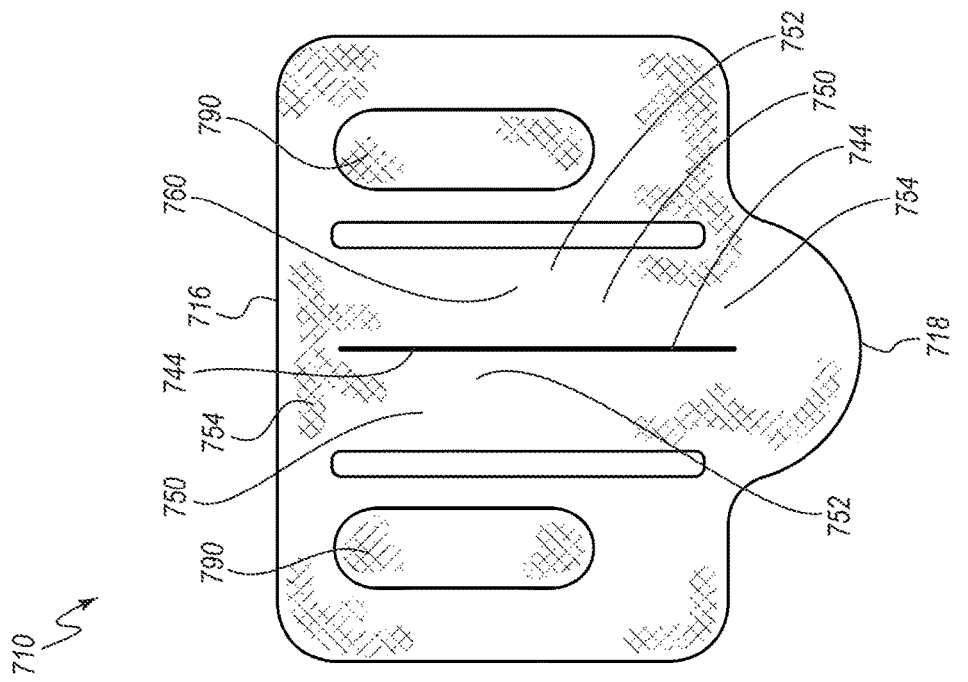
FIG. 7 is a rear view of an air cushion of an inflatable frontal restraint air cushion assembly, according to another embodiment.

FIG. 7 is a rear view of an air cushion 710, according to another embodiment of a frontal restraint air cushion assembly, with the air cushion 710 at least partially inflated. A proximal edge 716 and distal edge 718, as well as supplemental lobes 790, are shown for reference. In the embodiment of FIG. 7, a pair of vertical (or nearly vertical) openings 760 through the air cushion 710 at least partially defines an occupant impact zone 750. The occupant impact zone 750 generally occupies the region of the air cushion 710 between the two vertical openings 760. A free region 752, generally analogous to the free end of other embodiments (see, e.g., 152 in FIG. 2A), is located near the vertical (relative to the vehicle) center of the occupant impact zone 750. A pair of fixed ends 754 are located proximal to the proximal edge 716 and the distal edge 718 of the air cushion 710. In other words, the two fixed ends 754 are at opposite vertical ends of the occupant impact zone 750 such that each is opposite the free region 752. One of the fixed ends 754 is located approximately between or adjacent to the upper extents 761 of the openings 760. One of the fixed ends 754 is located approximately between or adjacent to the lower extents 762 of the openings 760. In an embodiment according to FIG. 7, the air cushion 710 may include one or more vertical internal tethers similar to the vertical internal tether 140 of FIG. 2A and demarked in FIG. 7 by a rear interface 744.

The configuration of the openings 760 and the occupant impact zone 750 according to the embodiment of FIG. 7 may permit the occupant impact zone 750 to articulate or deflect in order to absorb energy between the head and torso of an occupant (see, e.g., 52, 54, 50 in FIG. 1A) and a steering wheel (see, e.g., 16 in FIG. 1C). A supplemental reaction lobe (see, e.g., 1170 in FIG. 10) may be disposed on the vehicle facing side of the air cushion 710 to support the head and torso of an occupant (see, e.g., 1052, 1054, 1050 in FIG. 10) and absorb impact energy between the occupant 1050 and a vehicle structure immediately forward of the vehicle seating position (e.g., a dashboard or seat back (see, e.g., 1011, 1034 in FIG. 10)).

While FIGS. 3-7 illustrate a variety of embodiments in which the opening (360, 460, 560, 660, 760, respectively, in FIGS. 3-7) has specifically identified shapes, other shapes of the opening are possible and anticipated by this disclosure. For example, the opening may have the shape of a letter "V," or an inverted letter "V," or a sideways letter "V," among other possibilities.

Figure 8:
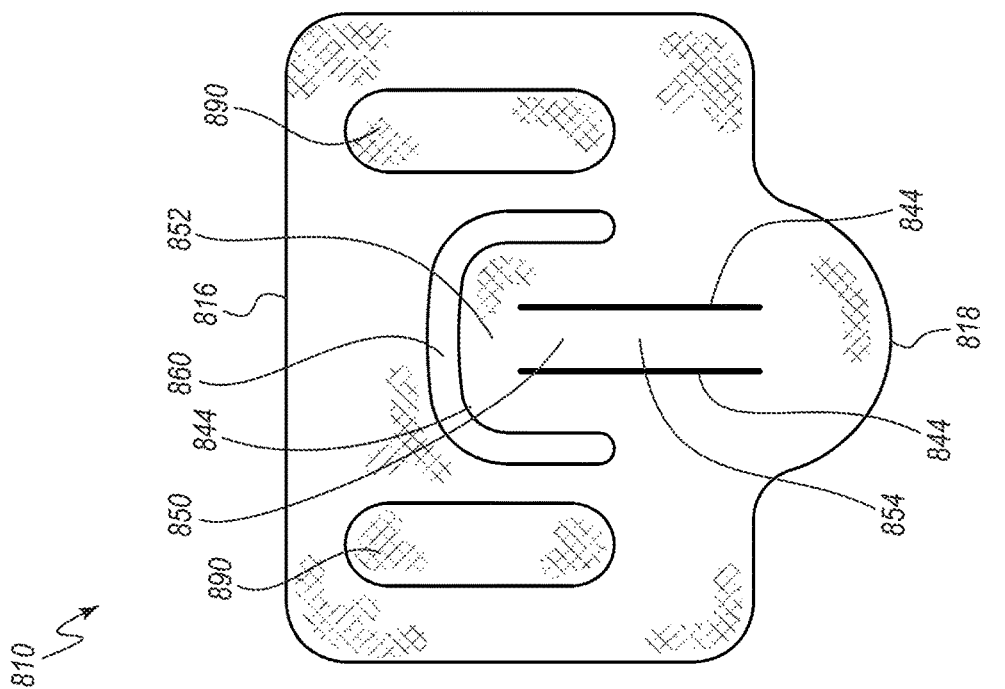
FIG. 8 is a rear view of an air cushion of an inflatable frontal restraint air cushion assembly, according to another embodiment, that includes multiple vertical internal tethers.

FIG. 8 is a rear view of an air cushion 810, according to another embodiment of an inflatable frontal restraint air cushion assembly, with the air cushion 810 at least partially inflated, and having multiple vertical internal tethers (see, e.g., 140 in FIG. 2A). A proximal edge 816 and distal edge 818, as well as supplemental lobes 890, are shown for reference. An occupant impact zone 850, with a free end 852 and fixed end 854, are also shown for reference. In an embodiment according to FIG. 8, the air cushion 810 may include two vertical internal tethers (see, e.g., 140 in FIG. 2A), here demarked at rear interfaces 844. While FIG. 8 illustrates an embodiment having two vertical internal tethers 140, other embodiments may have more vertical internal tethers 140 to facilitate in shaping and disposing the air cushion 810.

In an embodiment according to FIG. 8 configured for a passenger vehicle seating position (see, e.g., 1030 in FIG. 10), the air cushion 810 may include a supplemental reaction lobe (see, e.g., 1170 in FIG. 10).

Figure 9:
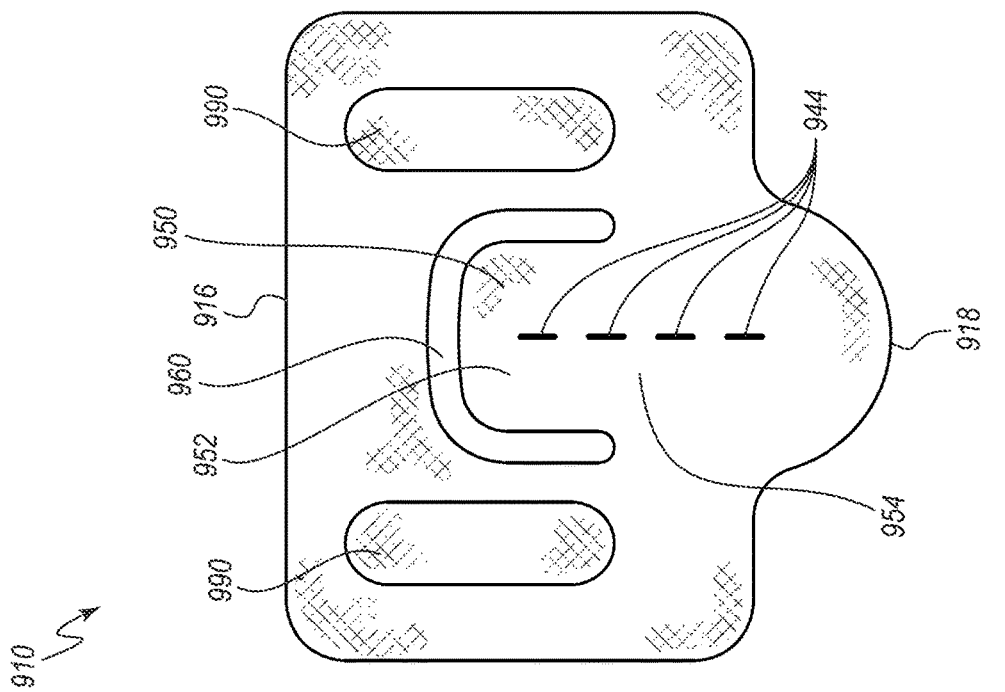
FIG. 9 is a rear view of an air cushion of an inflatable frontal restraint air cushion assembly, according to another embodiment, that includes another configuration of multiple vertical internal tethers.

FIG. 9 is a rear view of an air cushion 910, according to another embodiment, similar to the inflatable frontal restraint air cushion assembly 100 of FIG. 1A with the air cushion 910 at least partially inflated, and having another configuration of multiple vertical internal tethers (see, e.g., 140 in FIG. 2A). A proximal edge 916 and distal edge 918, as well as supplemental lobes 990, are shown for reference. An occupant impact zone 950, with a free end 952 and fixed end 954, are also shown for reference. In an embodiment according to FIG. 9, the air cushion 910 may include a series of vertical internal tethers (see, e.g., 140 in FIG. 2A) aligned along a common vertical (relative to the vehicle) line, here demarked at rear interfaces 944. While FIG. 9 illustrates an embodiment having four vertical internal tethers 140 in a single vertical line, other embodiments may have more or fewer vertical internal tethers 140 in a single vertical line to facilitate in shaping and disposing the air cushion 910. In yet other embodiments, there may be more than one vertical line of vertical internal tethers 140.

In an embodiment according to FIG. 9 configured for a passenger vehicle seating position (see, e.g., 1030 in FIG. 10), the air cushion 910 may include a supplemental reaction lobe (see, e.g., 1170 in FIG. 10).

FIG. 10 is a side view of a vehicle seating position 1030 within a vehicle 1010 having an inflatable frontal restraint air cushion assembly 1100 similar to the frontal restraint air cushion assembly 100 of FIG. 1A with an air cushion 1110 deployed and at least partially inflated and engaged by the occupant 1050. The embodiment of FIG. 10 illustrates a frontal restraint air cushion assembly 1100 for a front passenger vehicle seating position 1030. Similarly configured embodiments may be utilized for protecting an occupant in a passenger vehicle seating position elsewhere than in the front row, such as a middle row or rear row vehicle seating position.

The frontal restraint air cushion assembly 1100 includes a housing 1102 to be mounted to a roof 1014 of a passenger compartment of the vehicle 1010. By way of example, the frontal restraint air cushion assembly 1100 may be mounted in or to a header of the roof 1014. Prior to deployment, as in a collision event, the air cushion 1110 is in a packaged state within the housing 1102. The frontal restraint air cushion assembly 1100 includes an inflator 1104 within, partially within, or adjacent to the housing 1102. The frontal restraint air cushion assembly 1100 includes the air cushion 1110 defining an inflatable chamber 1120 to receive inflation gas from the inflator 1104 to expand and deploy from the housing 1102 downward to a deployed state disposed between the vehicle seating position 1030 and a component of the vehicle 1010 that is forward of the vehicle seating position 1030. A Y-sock 1106 may be utilized to direct the inflation gases in two directions in order to facilitate rapid and even deployment, inflation, and disposition of the air cushion 1110. For example, a Y-sock may be used to direct inflation gases both inboard and outboard, distributing and/or channeling inflation gases to more outward areas of the inflatable chamber 1120 first.

The component of the vehicle 1010 forward of the vehicle seating position 1030 may be a dashboard 1011 when the specific vehicle seating position 1030 is in a front seating row within the vehicle 1010. If the vehicle seating position 1030 is in a middle or rear seating row within the vehicle 1010, a supplemental reaction lobe 1070 may extend forward to engage (react off) the seat back 1034 of an immediately forward seat assembly 1032.

The frontal restraint air cushion 1110 may be a frontal curtain airbag. The air cushion 1110 includes supplemental lobes 1190 to assist in receiving the head 1052 of the occupant 1050 on the air cushion 1110, as further described elsewhere in this disclosure. The frontal restraint air cushion 1110 includes one or more supplemental reaction lobes 1170. A supplemental reaction lobe 1170 may couple to the lower portion of a vehicle facing panel 1112 of the air cushion 1110. Where the supplemental reaction lobe 1170 couples to a vehicle facing panel 1112, an aperture, vents, or other suitable accommodation is included to facilitate fluid communication with the supplemental reaction lobe 1170. In other words, the supplemental reaction lobe 1170 may be contiguous to the inflatable chamber 1120 such that inflation gas may freely communicate to the supplemental reaction lobe 1170.

Figure 11:
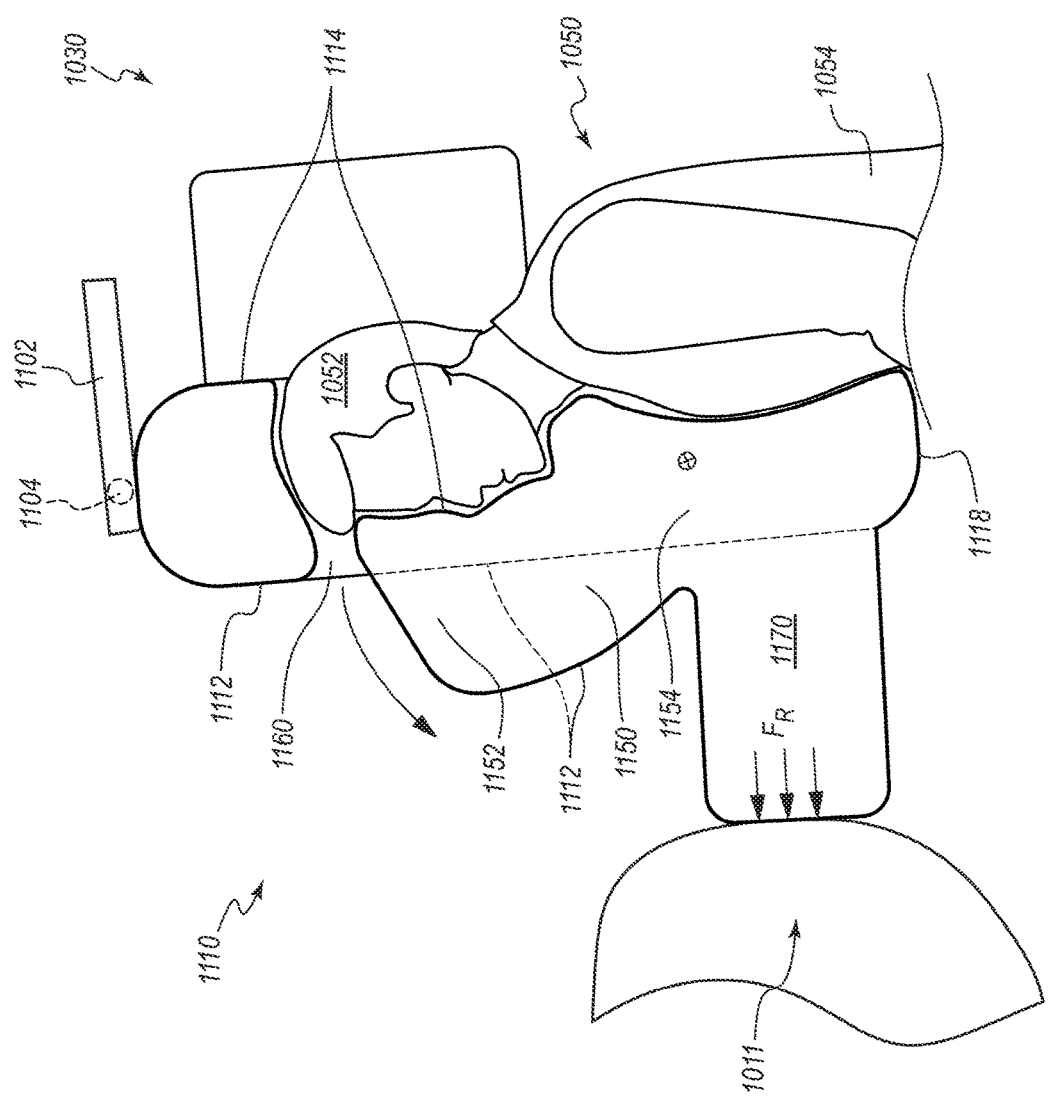
FIG. 11 is a cutaway side view of the frontal restraint air cushion of FIG. 10 with the air cushion at least partially inflated and impacted by the occupant.

FIG. 11 is a cutaway side view of the frontal restraint air cushion 1110 of FIG. 10 with the air cushion 1110 at least partially inflated, and impacted by the occupant 1050. The housing 1102 and inflator 1104 are shown for reference. A Y-sock may direct the inflation gases from the inflator 1104 in two directions in order to facilitate rapid and even deployment, inflation, and disposition of the air cushion 1110, as described.

The air cushion 1110 is configured to deploy from the packaged state at the roof (or header) (see, e.g., 1014 in FIG. 10) of the passenger compartment to a deployed state disposed between an instrument panel or dashboard 1011 of the vehicle 1010 and the vehicle seating position 1030 to provide collision protection for the occupant 1050 of the vehicle 1010.

The air cushion 1110 includes a gap or opening 1160 through the air cushion 1110 extending from a rearward surface (an occupant facing panel 1114) to a forward surface (the vehicle facing panel 1112) at an interior (inward) region of the air cushion 1110. The air cushion 1110 includes a deflectable occupant impact zone 1150 defined by the opening 1160 at the interior (inward) region of the air cushion 1110. The deflectable occupant impact zone 1150 includes a free end 1152 defined by the opening 1160 to pivot relative to a fixed end 1154. The deflectable occupant impact zone 1150 is to be positioned in the deployed state of the air cushion 1110 to receive the head 1052 of the occupant 1050 moving from the vehicle seating position 1030 primarily in a forward direction relative to the vehicle 1010 during a vehicle impact event. The deflectable occupant impact zone 1150 is configured to deflect forward within the opening 1160 with the impact of the head 1052 of the occupant 1050.

The air cushion 1110 further comprises a supplemental reaction lobe 1170 extending forward from the forward surface to engage (e.g., react off) the instrument panel or dashboard 1011 to support a lower or bottom end, portion or edge (e.g., at or near a distal edge 1118) of the frontal restraint air cushion 1110 to facilitate deflection of the occupant impact zone 1150 with the impact of the head 1052 of the occupant 1050. The supplemental reaction lobe 1170 is configured to engage the dashboard 1011, when in a front row configuration, or a seat back (see, e.g., 1034 in FIG. 10) when in a middle or rear row, to support the air cushion 1110 and, more specifically, the occupant impact zone 1150. The supplemental reaction lobe 1170 transfers the deceleration energy or force $F_R$ of the torso 1054 to the dashboard 1011 or seat back 1034. As the supplemental reaction lobe 1170 supports the lower portion of the occupant impact zone 1150, including the fixed end 1154 of the occupant impact zone 1150, the supplemental reaction lobe 1170 permits the free end 1152 of the occupant impact zone 1150 to articulate or rotate to accommodate the impact of the head 1052 of the occupant 1050 against the occupant impact zone 1150.

FIG. 12 is a rear view of an air cushion 1210 of an inflatable frontal restraint air cushion assembly, according to another embodiment, including one or more restraint tethers 1280. The restraint tether(s) 1280 can be included to tune the restraint to the head and neck of an occupant. In certain embodiments or applications, size and/or shape of the opening may limit or otherwise provide insufficient restraint of the head and neck. A restraint tether 1280 extends across the opening 1260 at a location and with a length to adjust how much force is exerted to restrain the head. For example, a restraint tether 1280 may be coupled at a first end to the occupant impact zone 1250 and coupled at a second end to a lateral support region 1232 at an outward area of the air cushion 1210.

The restraint tethers 1280 may be short to provide early coupling and longer to allow more forward excursion of the free end 152 of the occupant impact zone. Additionally, once the head passes into the cutout area of the opening 1260 the head is essentially surrounded by portions of the cushion 1210 on the sides and on top, thus providing protection against angled vehicle movement as may occur in an angled impact or NHTSA's propose Oblique Impact test. The restraint tethers 1280 may limit the forward motion of the head to keep it contained/aligned for the angular motion. Without the restraint tethers 1280, the head might push completely through the opening 1260 and might impact against an undesirable location.

The restraint tethers 1280 may provide more restraint control by including folds with tack/breakaway stitches, thus absorbing energy and limiting acceleration peaks by allowing the fold stitches to break, as needed.

The following additional components of the air cushion 1210 are identified for reference and comparison: a proximal edge 1216 and a distal edge 1218; the occupant impact zone 1250, including the free end 1252 and a fixed end 1254; the rear interface 1244 (of a vertical internal tether); and supplemental lobes 1290.

Throughout this specification, the phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

The phrases "attached to" or "attached directly to" refer to interaction between two or more entities which are in direct contact with each other and/or are separated from each other only by a fastener of any suitable variety (e.g., mounting hardware or an adhesive).

The phrase "fluid communication" is used in its ordinary sense, and is broad enough to refer to arrangements in which a fluid (e.g., a gas or a liquid) can flow from one element to another element when the elements are in fluid communication with each other.

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or orientation extending or spanning between a front of a vehicle and a rear of the vehicle.

As used herein, the terms "forward" and "rearward" are used with reference to the front and back of the relevant vehicle. For example, an airbag cushion that deploys in a rearward direction deploys toward the back of a vehicle. Furthermore, other reference terms, such as "horizontal," are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill).

As used herein, "inboard" refers to a direction toward a centerline of a vehicle and "outboard" refers to a direction out of the vehicle and away from a centerline of the vehicle.

Unless otherwise stated, all ranges include both endpoints and all numbers between the endpoints.

The phrase "vehicle seating position" refers to the position in which an occupant is generally positioned when seated in a seat of a vehicle.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. A frontal restraint air cushion comprising:
one or more panels forming the frontal restraint air cushion and defining an inflatable chamber to receive inflation gas and expand the frontal restraint air cushion to deploy from a packaged state at a vehicle roof of a passenger compartment of a vehicle downward to a deployed state that is at least partially disposed between the vehicle and a vehicle seating position; and
an occupant impact zone formed by an opening at an inner area of the frontal restraint air cushion extending from a rearward surface to a forward surface, the opening defining a free end of the occupant impact zone and a fixed end of the occupant impact zone such that the free end is pivotable relative to the fixed end, the occupant impact zone to be positioned in the deployed state of the cushion to receive a head of an occupant moving from the vehicle seating position primarily in a forward direction relative to the vehicle during a vehicle impact event, the occupant impact zone to deflect forward with impact of the head of the occupant.

2. The frontal restraint air cushion of claim 1, further comprising:
a vertical internal tether coupled at a first end to an interior of a panel of the one or more panels forming the rearward surface and at a second end to an interior of a panel of the one or more panels forming the forward surface, the vertical internal tether to limit a thickness of the frontal restraint air cushion and thereby control a shape of the air cushion.

3. The frontal restraint air cushion of claim 1, further comprising a supplemental lobe disposed on the rearward surface at a position outward from the opening at the inner area of the frontal restraint air cushion, the supplemental lobe extending rearward from the rearward surface, the supplemental lobe to receive the head of the occupant and limit rotation of the head in an oblique collision event.

4. The frontal restraint air cushion of claim 1, further comprising a y-sock within the inflatable chamber to direct inflation gas in two different directions.

5. The frontal restraint air cushion of claim 1, further comprising a restraint tether coupled at a first end to the occupant impact zone and coupled at a second end to a lateral support region at an outward area of the frontal restraint air cushion.

6. The frontal restraint air cushion of claim 1, configured to deploy from the packaged state at the roof of the passenger compartment to a deployed state disposed between a steering wheel of the vehicle and the vehicle seating position to provide collision protection for a driver of the vehicle.

7. The frontal restraint air cushion of claim 6, wherein the occupant impact zone is configured to deflect forward and around the steering wheel with impact of the head of the occupant.

8. The frontal restraint air cushion of claim 6, further comprising cutaway areas at a bottom edge of the frontal restraint air cushion, the cutaway areas to accommodate one or more of hands and arms of the occupant holding the steering wheel.

9. The frontal restraint air cushion of claim 1, configured to deploy from the packaged state at the roof of the passenger compartment to a deployed state disposed between an instrument panel of the vehicle and the vehicle seating position to provide collision protection for a passenger of the vehicle.

10. The frontal restraint air cushion of claim 9, further comprising a supplemental reaction lobe extending forward from the forward surface to engage the instrument panel to support a lower end of the frontal restraint air cushion.

11. The frontal restraint air cushion of claim 1, wherein the opening at the inner area of the frontal restraint air cushion is shaped as an upside-down "U" shape.

12. The frontal restraint air cushion of claim 1, wherein the opening at the inner area of the frontal restraint air cushion is shaped as one of a "U" shape, a sideways "U" shape, an "H" shape, an upside-down "T" shape, a "V" shape, an upside-down "V" shape, and a sideways "V" shape.

13. The frontal restraint air cushion of claim 1, wherein the frontal restraint air cushion is configured to deploy to engage a reaction surface to secure the frontal restraint air cushion and/or absorb energy between the occupant and the reaction surface.

14. A frontal curtain airbag comprising:
an inflatable cushion to be mounted in a vehicle in a packaged state at a header of a vehicle compartment of the vehicle, the inflatable cushion to receive inflation gas to expand and deploy downward to a deployed state disposed between a vehicle seating position and a component of the vehicle that is positioned forward of the vehicle seating position;
an opening formed through the cushion to extend from an occupant-receiving surface to a vehicle-contacting surface, the opening at an inward region of the cushion; and
a deflectable occupant impact zone defined by the opening, the deflectable occupant impact zone including a free end and a fixed end, the free end defined by the opening to pivot relative to the fixed end, wherein the deflectable occupant impact zone is to be positioned in the deployed state of the inflatable cushion to receive and flex forward with a head of a vehicle occupant moving from a vehicle seating position primarily in a forward direction relative to the vehicle during a vehicle impact event.

15. The frontal curtain airbag of claim 14, comprising an inflatable chamber including inflatable portions of both the occupant impact zone and surrounding portions of the frontal curtain airbag.

16. The frontal curtain airbag of claim 14, wherein the inflatable chamber comprises an inflatable portion of the deflectable occupant impact zone.

17. The frontal curtain airbag of claim 14, wherein an inflatable portion of the deflectable occupant impact zone is integral to the inflatable chamber.

18. The frontal curtain airbag of claim 14, wherein the inflatable cushion is configured to deploy to engage a reaction surface to absorb energy between the vehicle occupant and the reaction surface.

19. The frontal curtain airbag of claim 14, further comprising:
a vertical internal tether coupled at a first end to an interior of a panel of one or more panels forming a rearward surface and at a second end to an interior of a panel of one or more panels forming a forward surface, the vertical internal tether to limit a thickness of the frontal curtain airbag and thereby control a shape of the frontal curtain airbag.

20. The frontal curtain airbag of claim 14, configured to deploy to the deployed state disposed between the vehicle seating position and one of a steering wheel and an instrument panel of the vehicle.

21. An airbag assembly, comprising:
a housing to be mounted at a roof of a passenger compartment of a vehicle; and
a frontal inflatable cushion in a packaged state within the housing, the cushion defining an inflatable chamber to receive inflation gas to expand and deploy from the housing assembly downward to a deployed state disposed between a vehicle seating position and a component of the vehicle that is forward of the vehicle seating position, the cushion comprising:
a gap through the cushion extending from a rearward surface to a forward surface at an interior of the cushion; and
a deflectable occupant impact zone defined by the gap at the interior of the cushion, the deflectable occupant impact zone including a free end defined by the gap to pivot relative to a fixed end, the deflectable occupant impact zone to be positioned in the deployed state of the cushion to receive a head of a vehicle occupant moving in a forward direction relative to the vehicle during a vehicle impact event, the deflectable occupant impact zone to deflect forward with impact of the head of the vehicle occupant.

22. The airbag assembly of claim 21, wherein the frontal inflatable cushion comprises a y-sock fluidly coupled to the inflator to direct inflation gas in two different directions within the cushion.

23. The airbag assembly of claim 21, further comprising a restraint tether coupled at a first end to the occupant impact zone and coupled at a second end to a lateral support region at an outward area of the frontal restraint air cushion.

24. The airbag assembly of claim 21, further comprising a supplemental reaction lobe extending forward from a forward surface to engage the instrument panel to support a lower end of the airbag assembly.

25. The airbag assembly of claim 21, wherein the assembly is configured to deploy a cushion to engage a reaction surface to secure the assembly and/or absorb energy between the vehicle occupant and a reaction surface.

* * * * *